United States Patent [19]

Gay

[11] 4,123,400

[45] Oct. 31, 1978

[54] HEAT-STABILIZED PVC COMPOSITIONS

[75] Inventor: Michel Gay, Lyons, France

[73] Assignee: Rhone-Poulenc Industries, Paris, France

[21] Appl. No.: 810,849

[22] Filed: Jun. 28, 1977

[30] Foreign Application Priority Data

Jun. 28, 1976 [FR] France .............................. 76 20180

[51] Int. Cl.$^2$ .............................................. C08K 5/09
[52] U.S. Cl. .......................... 260/23 XA; 260/30.6 R; 260/31.6; 260/31.8 XA; 260/45.8 A; 260/45.8 NT; 260/45.7 R; 260/42.49; 260/45.95 L
[58] Field of Search ...... 260/23 XA, 45.7 R, 45.95 L, 260/42.49, 30.6, 31.6, 31.8 XA, 45.8 A, 45.8 NT, 899

[56] References Cited

U.S. PATENT DOCUMENTS

| | | | |
|---|---|---|---|
| 2,711,401 | 6/1955 | Lally ................................. | 260/45.75 |
| 3,001,970 | 9/1961 | Ebel et al. ......................... | 260/45.7 R |
| 3,310,525 | 3/1967 | Lappin et al. ................... | 260/45.95 F |
| 3,373,130 | 3/1968 | Hardy ................................. | 260/31.8 |
| 3,493,536 | 2/1970 | Weisfeld ........................... | 260/45.7 R |

OTHER PUBLICATIONS

Kunstoffe 67 (1977) 3 pp. 9 to 11.

*Primary Examiner*—V. P. Hoke
*Attorney, Agent, or Firm*—Bacon & Thomas

[57] ABSTRACT

PVC is stabilized against the effects of heat by formulating therewith minor amounts of [1] a mixed organometallic salt couplet, [2] a polyol, and [3] a $\beta$-diketone.

17 Claims, No Drawings

HEAT-STABILIZED PVC COMPOSITIONS

BACKGROUND OF THE INVENTION

1. Field of the Invention

The present invention relates to heat-stabilized poly(vinyl chloride) compositions.

2. Description of the Prior Art

The use of various organic compounds, conjointly with various organic salts of metals, for purposes of stabilizing compositions based on a vinyl chloride polymer is well known to the art.

DESCRIPTION OF THE INVENTION

An improvement has now been found which makes it possible to increase such heat stabilization, which stabilization manifests itself as an increase in the length of the time period of the heat treatment to which the material is or can be subjected before substantial yellowing or brown colorations appear. This improvement, according to the invention, comprises the use of compositions based on a vinyl chloride polymer, which compositions are characterized in that they contain, relative to the weight of the polymer:

[a] from 0.1 to 5% by weight of one of the four pairs of organic salts of the following metals: Ca-Zn, Ca-Cd, Ba-Zn or Ba-Cd;

[b] from 0.05 to 1% by weight of a polyol; and

[c] from 0.05 to 5 parts by weight of an organic compound having the structural formula:

$$R_1 - CO - CHR_2 - CO - R_3 \qquad (I)$$

wherein $R_1$ and $R_3$, which may be identical or different, represent:

a linear or branched chain alkyl or alkenyl radical having at least one and up to 36 carbon atoms, an aralkyl radical having from 7 to 36 carbon atoms, or an aryl or cycloaliphatic radical having fewer than 14 carbon atoms, the cycloaliphatic radicals optionally comprising carbon-to-carbon unsaturation or double bonds.

The foregoing radicals either may or may not be substituted, and, when substituted, suitable substituents comprise, for example, halogen atoms, or, in the case of the aryl or cycloaliphatic radicals, methyl or ethyl radicals; they too can be modified by the presence of one or more of the linkages —O—,

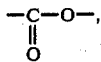

—CO—, in the aliphatic chain; and together same can also represent a divalent alkylene radical of 2 to 5 carbon atoms which optionally contains a bridging oxygen or nitrogen atom.

$R_2$ represents:

a hydrogen atom, an alkyl or alkenyl radical having at least one and up to 36 carbon atoms, which may contain one or more of the linkages —O—,

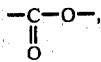

—CO—, a radical of the formula —CO—$R_4$, with $R_4$ representing an alkyl radical having from 1 to 36 carbon atoms, or an aryl radical having from 6 to 10 carbon atoms, or a radical of the formula

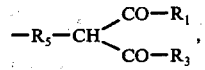

with $R_5$ representing an alkyl radical having from 1 to 6 carbon atoms and $R_1$ and $R_3$ being as above.

The radicals represented by the symbols $R_1$, $R_2$ and $R_3$ are, furthermore, such that:

for $R_1$ and $R_3$, the carbon atom bonded to the respective carbonyl function is of the compound (I) free from ethylenic unsaturation or carbonyl unsaturation, and for $R_1$ or $R_3$, the carbon atom bonded to the respective carbonyl function does not comprise a moiety which includes aromatic unsaturation.

One of the radicals $R_1$ or $R_3$ can represent a hydrogen atom.

$R_1$ and $R_2$ together can represent a divalent radical selected from among the following:

a linear or branched alkylene or alkenylene radical having up to 36 carbon atoms, an aralkylene radical having from 7 to 36 carbon atoms, or an arylene or cycloaliphatic radical having fewer than 14 carbon atoms, the cycloaliphatic radicals optionally comprising carbon-to-carbon unsaturation or double bonds.

These latter radicals too either may or may not be substituted, and, when substituted, suitable substituents comprise, for example, halogen atoms, or, in the case of the aryl or cycloaliphatic radicals, methyl or ethyl radicals.

The radicals heretofore enumerated can also be modified by the presence of one or more of the linkages:

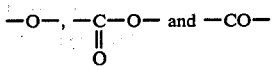

in any given aliphatic chain.

The stabilizing systems above identified can additionally comprise an epoxidized compound, such as, for example, epoxidized soya-bean oil, in a proportion of between 0 and about 8% by weight relative to the polymer. The addition of this type of compound further improves the heat stability.

By "poly (vinyl chloride) composition" or compositions based on a vinyl chloride polymer, or the like, there is intended those compositions comprising either homopolymers or copolymers of vinyl chloride, including those which contain the various adjuvants typically incorporated to facilitate processing, or to impart particular properties to any resultant shaped article.

Any type of vinyl chloride homopolymer is suitable, regardless of its method of preparation, which may be by bulk polymerization, suspension polymerization, dispersion polymerization, or any other type of polymerization, and regardless of its intrinsic viscosity.

Numerous copolymers of vinyl chloride can also be stabilized against the effects of heat by means identical to those employed for the homopolymers. Such copolymers include, for example, those obtained by copolymerization of vinyl chloride with other ethylenically unsaturated comonomers copolymerizable therewith, for example, vinylidene chloride, ethylene, acrylic esters, styrene, vinyl esters, maleic acid or maleic anhydride, and maleate esters.

The copolymers typically contain at least 50% by weight of vinyl chloride. However, the stabilization according to the invention is particularly applicable to copolymers containing at least 80% by weight of vinyl chloride, with the other monomer comprising the copolymer preferably being vinyl acetate or vinylidene chloride.

The compositions according to the invention destined for working into rigid shaped articles generally comprise modifiers to increase impact strength, and, optionally, pigments, fillers, lubricants, and the like, in addition to the polymer and the noted stabilizers. Antioxidants, light stabilizers and/or UV stabilizers can also be added to the subject compositions.

The stabilizer components comprising the organic salts of metals according to the invention, are most preferably the calcium, barium, zinc or cadmium salts of the saturated or unsaturated, substituted or unsubstituted, aliphatic organic carboxylic acids, or the aromatic carboxylic acids. Nonetheless, the combination of the calcium salts with the zinc salts is most preferred because of non-toxicity attributes. Among the salts advantageously employed, there may be mentioned as representative the acetates, the diacetates, the stearates, the oleates, the laurates, the palmitates, the benzoates, the hydroxystearates and the 2-ethyl-hexanoates. Such salts are desirably incorporated as pairs, or salt couples, for example, as the mixed salts: calcium/zinc, barium/cadmium, calcium/cadmium or barium/zinc, most desirably in proportions of between about 0.1 and 5% by weight relative to the weight of the polymer.

The aforesaid pairs of metal salts, or salt couples, may optionally be incorporated in association or conjunction with an organo-tin mercaptide.

Any and all of the polyols are suitable. However, those aliphatic polyols having at least 2, and preferably 4, hydroxyl groups are the preferred. The cycloalkane polyols bearing at least two primary hydroxyl functions are also suitable.

Particularly valuable results are obtained by utilizing the following polyols: D-xylitol, D-sorbitol, D-mannitol, diglycerol, 4-hydroxy-3,3,5,5-tetrahydroxymethyl-tetrahydropyran, trihydroxyethyl isocyanurate, polyvinyl alcohol, trimethylolpropane, trimethylolethane, tetramethylolcyclohexanol, quinic acid, adonitol, α-methylglucoside and glycerol.

All of the β-diketone compounds (I) as defined above are practicable and operable according to the invention, whether they be used individually or in admixture with each other. Among the more preferred β-diketones, there are mentioned as representative: benzoyl-acetone, lauroyl-benzoyl-methane, myristoyl-benzoylmethane, palmitoyl-benzoyl-methane, stearoyl-benzoyl-methane, behenoyl-benzoyl-methane, dilauryol-methane, dimyristoyl-methane, dipalmitoyl-methane, distearoyl-methane, dibehenoyl-methane, lauroyl-myristoyl-methane, lauroyl-palmitoyl-methane, lauroyl-stearoyl-methane, lauroyl-behenoyl-methane, myristoyl-palmitoyl-methane, myristoyl-stearoyl-methane, myristoyl-behenoyl-methane, palmitoyl-stearoyl-methane, palmitoyl-behenoyl-methane, stearoyl-behenoyl-methane, 1-phenyl-triacontane-1,3-dione, acetyltetralone, palmitoyltetralone, stearoyltetralone, palmitoylcyclohexanone, stearoylcyclohexanone and (para-methoxybenzoyl)-stearoyl-methane.

The subject β-diketones are formulated in proportions of between about 0.05 and 5% by weight relative to the weight of the PVC, preferably between 0.1 and 1% by weight.

The actual formulation of the compositions according to the invention can be effected in accordance with any known process. The various stabilizers can be admixed with the plasticizer, either individually or after having themselves been mixed with each other, and can thence be incorporated into the polymer. Any and all of the typical methods known to this art are well suited for formulating any given mixture of the individual ingredients. Nevertheless, the homogenization of any composition according to the invention is advantageously carried out by means of a malaxator or a roll mixer, and any such procedure is advantageously conducted at a temperature such that the mass is fluid, which facilitates mixing. This temperature can be, for example, on the order of 100° C.

The compositions of the present invention may contain additional ingredients including epoxidized soyabean oil, an antioxidant, a light stabilizer, a UV stabilizer, a lubricant, an impact strength modifier, a pigment, a filler, an organo-tin mercaptide, a plasticizer, and admixtures thereof. Such additives are conventionally employed in resin compositions and are readily recognized by those of skill in the art.

The compositions themselves can be processed in accordance with conventional techniques normally employed for processing the state-of-the-art PVC compositions, for example, by extrusion, by injection, by calendering, by molding, by rotational molding, by slush molding or by deposition on a carrier or support which may or may not be provided with a release surface, or by extrusion/blow molding.

The conjoint admixture of the β-diketone stabilizer, the stabilizer comprising the pair of metal salts, and the polyol enables one to retard the onset of yellowing for the entire duration of any processing parameter, particularly in those cases where the material is first charged into the processing apparatus.

The value of the association or combination of stabilizers according to the invention is particularly marked if the pair of metal salts selected consists of a calcium/zinc mixed salt couple, both from the point of view of effectiveness as a heat stabilizer and from the point of view of non-toxicity.

In order to further illustrate the present invention and the advantages thereof, the following specific examples are given, it being understood that same are intended only as illustrative, and in nowise limitative.

EXAMPLES 1 to 20

A composition "A" which is especially well suited for the blow molding of bottles was prepared as follows:

The following were mixed in a ball mill:

2,000 g of PVC powder, having a viscosity index of 80 (standard specification NF T 51,013), obtained by suspension polymerization of vinyl chloride in water and marketed under the trade name LUCOVYL RS 8,000;

200 g of an agent for improving impact strength, namely, a copolymer of butadiene, styrene and methyl methacrylate;

20 g of a lubricant, a wax based on a colophony ester and marketed under the trade mark Wax E;
10 g of calcium stearate;
14 g of zinc stearate;
60 g of epoxidized soya oil; and
6 g of a trinonylphenyl phosphite.

The mixture was permitted to tumble on rollers for 15 hours.

Twenty powder mills of 250 cm$^3$, each containing a few porcelain balls, were individually charged with 56 g of this composition and, respectively:

TABLE I

1  Comparison: composition A, unmodified
2  Sorbitol: 0.15 g
3  Mannitol: 0.15 g
4  Benzoylacetone: 0.15 g
5  Benzoylacetone: 0.15 g + D-sorbitol: 0.15 g
6  Benzoylacetone: 0.15 g + D-mannitol: 0.15 g
7  Benzoylacetone: 0.15 g + glycerol : 0.30 g
8  Benzoylacetone: 0.15 g + diglycerol: 0.40 g
9  Benzoylacetone: 0.15 g + trimethylolpropane: 0.45 g
10 Benzoylacetone: 0.15 g + trimethylolethane : 0.40 g
11 Benzoylacetone: 0.15 g + tetramethylolcyclohexanol: 0.45 g
12 Benzoylacetone: 0.15 g + quinic acid: 0.15 g
13 Benzoylacetone: 0.15 g + 2.92 g of a 25% strength solution of partially hydrolyzed polyvinyl alcohol in methanol
14 Stearoylacetophenone: 0.30 g
15 Stearoylacetophenone: 0.30 g + D-sorbitol: 0.15 g
16 Stearoylacetophenone: 0.30 g + D-mannitol: 0.15 g
17 Stearoylacetophenone: 0.30 g + diglycerol: 0.40 g
18 Stearoylacetone: 0.25 g
19 Stearoylacetone: 0.25 g + D-sorbitol: 0.15 g
20 Stearoylacetone: 0.25 g + diglycerol: 0.40 g The mixture was permitted to tumble on a roll mixer for 15 hours and homogeneous compositions were thus obtained.

Sheets 2.5 mm thick were prepared from these compositions by means of a calender heated to 180° C. (the molding time at 180° C. was about 3 minutes).

Rectangular specimens of a size 10 × 20 mm were cut from these sheets and were then placed in a ventilated oven at 180° C. for varying periods of time.

The coloration of the samples was then determined according to the Gardner scale, with the aid of a Lovibond disc.

The following results were obtained:

TABLE II

| Compositions | Color index after X minutes | | | | | | | | | |
|---|---|---|---|---|---|---|---|---|---|---|
| | 0 | 7 | 14 | 21 | 28 | 35 | 42 | 56 | 70 | 84 | 98 |
| 1 | 8 | 9 | 10 | 11 | 11 | 11 | black | | | | |
| 2 | 10 | 13 | 14 | 14 | 14 | 14 | 14 | 14 | 14 | 14 | |
| 3 | 10 | 13 | 14 | 14 | 14 | 14 | 14 | 14 | 14 | 14 | |
| 4 | 1 | 1 | 1.5 | 3 | 5 | black | | | | | |
| 5 | 1 | 2 | 2 | 3 | 4 | 4 | 4 | 6 | 10 | 13 | 15 |
| 6 | 1 | 1.5 | 2 | 3 | 4 | 4 | 4 | 5 | 9 | 13 | 15 |
| 7 | 1 | 1 | 1.5 | 1.5 | 3 | 5 | 9 | black | | | |
| 8 | 1 | 1 | 1.5 | 2 | 3 | 4.5 | 6 | 8 | 12 | 14 | |
| 9 | 1 | 1 | 1 | 1.5 | 2 | 3 | 4.5 | black | | | |
| 10 | 1 | 1 | 1 | 1.5 | 2 | 3 | 5 | black | | | |
| 11 | 1 | 1.5 | 2 | 2 | 3 | 4 | 5 | 6 | 8 | 11 | 12 |
| 12 | 1.5 | 1.5 | 2 | 3 | 3 | 4 | 5 | 7 | black | | |
| 13 | 1 | 1 | 1 | 1.5 | 2 | 4 | 6 | 10 | 11 | 13 | 14 |
| 14 | 1 | 1 | 1 | 1.5 | 3 | 5 | black | | | | |
| 15 | 1 | 2 | 3 | 3 | 4 | 4 | 4 | 4 | 10 | 13 | 15 |
| 16 | 1 | 1.5 | 3 | 3 | 4 | 4 | 4 | 4 | 9 | 13 | 15 |
| 17 | 1 | 1 | 1.5 | 2 | 3 | 3.5 | 5 | 6 | 8 | 12 | 14 |
| 18 | 1 | 1 | 1 | 1.5 | 2 | 3 | black | | | | |
| 19 | 1 | 2 | 3 | 3 | 4 | 4 | 4 | 5 | 10 | 13 | 14 |
| 20 | 1 | 1 | 1.5 | 2 | 4 | 4 | 7 | 8 | 12 | 14 | 14 |

EXAMPLES 21 to 24

A composition "B" was prepared in the same manner as the composition A described in Example 1, and with the same components. The stabilizers were:

| | |
|---|---|
| calcium stearate | 8 g |
| zinc stearate | 4 g |
| epoxidized soya oil | 60 g |
| trinonylphenyl phosphate | 6 g |

56 g of this composition B were charged into each of four 250 cm$^3$ powder mills, each containing a few porcelain balls, together with, respectively:

TABLE III

21 Comparison: composition B, unmodified
22 Benzoylacetone: 0.15 g
23 Benzoylacetone: 0.15 g + 0.15 g of D-xylitol
24 Benzoylacetone: 0.15 g + 0.6 g of a 25% strength solution of a partially hydrolyzed polyvinyl alcohol in methyl alcohol The heat resistance test was carried out as previously described, but at 185° C.

The following results were obtained:

TABLE IV

| Compositions | Color index after X minutes | | | | | | | | | |
|---|---|---|---|---|---|---|---|---|---|---|
| | 0 | 10 | 15 | 20 | 30 | 35 | 45 | 55 | 65 | 70 |
| 21 | 9 | 10 | 11 | 12 | 15 | black | | | | |
| 22 | 1 | 3 | 5 | 9 | brown black | | | | | |
| 23 | 1 | 2 | 3 | 3 | 6 | 12 | 13 | 13 | 14 | black |
| 24 | 1 | 3 | 5 | 9 | 13 | 15 | 15 | black | | |

EXAMPLES 25 to 42

A composition "C" was prepared in the same manner as the composition A described in Example 1, with the following components:

2,000 g of PVC obtained by bulk polymerization, which has a viscosity index of 95 and marketed under the trade mark LUCOVYL GB 9,550;
780 g of dioctyl phthalate;
10 g of calcium stearate; and
5 g of zinc stearate.

70 g of the composition C were charged into each of 18 250 cm$^3$ powder mills, each containing a few glass balls, together with, respectively:

TABLE V

25 Comparison: composition C, unmodified
26 Xylitol : 0.1 g
27 Sorbitol : 0.1 g
28 Mannitol : 0.1 g
29 Stearoyl-acetophenone: 0.25 g
30 Stearoyl-acetophenone: 0.25 g + D-xylitol: 0.03 g
31 Stearoyl-acetophenone: 0.25 g + D-xylitol: 0.07 g
32 Stearoyl-acetophenone: 0.25 g + D-xylitol: 0.10 g
33 Stearoyl-acetophenone: 0.25 g + D-xylitol: 0.15 g
34 Stearoyl-acetophenone: 0.25 g + D-xylitol: 0.20 g
35 Stearoyl-acetophenone: 0.25 g + D-xylitol: 0.30 g
36 Stearoyl-acetophenone: 0.25 g + D-sorbitol: 0.10 g
37 Stearoyl-acetophenone: 0.25 g + D-mannitol: 0.1 g
38 Stearoyl-acetophenone: 0.25 g + diglycerol: 0.15 g
39 Stearoyl-acetophenone: 0.25 g + adonitol : 0.10 g
40 Stearoyl-acetophenone: 0.25 g + 0.97 g of a 25% strength solution of a partially hydrolyzed polyvinyl alcohol in methanol
41 Stearoyl-acetophenone: 0.25 g + 4-hydroxy-3,3,5,5-tetrahydroxymethyl-tetrahydropyran: 0.2 g
42 Stearoyl-acetophenone: 0.25 g + α-methylglucoside: 0.1 g A sheet was obtained by calendering at 160° C. (duration of processing at this temperature: about 3 minutes).

The heat resistance test was carried out as previously described, at 180° C.

The following results were obtained:

TABLE VI

| Compositions | \multicolumn{10}{c}{Color index after X minutes} |
|---|---|---|---|---|---|---|---|---|---|---|

| Compositions | 0 | 7 | 15 | 25 | 35 | 45 | 55 | 65 | 75 | 80 |
|---|---|---|---|---|---|---|---|---|---|---|
| 25 | 0 | 3 | 8 | black | | | | | | |
| 26 | 0 | 7 | 9 | 10 | 10 | 11 | 14 | 14 | 16 | 18 |
| 27 | 0 | 5 | 9 | 9 | 9 | 9 | 9 | 10 | 14 | 18 |
| 28 | 0 | 5 | 9 | 9 | 9 | 9 | 10 | 11 | 15 | 18 |
| 29 | 0 | 0 | black | | | | | | | |
| 30 | 0 | 0 | 0 | 0 | black | | | | | |
| 31 | 0 | 0 | 0 | 1 | 1 | 2 | 6 | 10 | 13 | brown |
| 32 | 0 | 0 | 0 | 1 | 1 | 2 | 2 | 3 | 9 | 16 |
| 33 | 0 | 0 | 1 | 2 | 3 | 4 | 4 | 5 | 6 | 7 |
| 34 | 0 | 0 | 1 | 2 | 3 | 4 | 4 | 4 | 4 | 5 |
| 35 | 0 | 2 | 3 | 3 | 3 | 5 | 5 | 9 | 12 | 16 |
| 36 | 0 | 0 | 0 | 1 | 1 | 1 | 1 | 2 | 9 | 16 |
| 37 | 0 | 0 | 0 | 0 | 1 | 1 | 2 | 2 | 10 | 18 |
| 38 | 0 | 0 | 0 | 1 | 2 | 5 | 12 | 12 | 15 | brown |
| 39 | 0 | 0 | 0 | 1 | 1 | 4 | brown | | | |
| 40 | 0 | 0 | 0 | 2 | 5 | 12 | 16 | brown-black | | |
| 41 | 0 | 0 | 0 | 1 | 2 | 4 | 15 | brown-black | | |
| 42 | 0 | 0 | 1 | 4 | brown-black | | | | | |

EXAMPLES 43 to 45

A composition "D" was prepared in the same manner as the composition C, but by replacing the calcium stearate with an equal weight of barium stearate, and the procedure followed was as above.

The following compositions were obtained:

TABLE VII

| 43 | Comparison: composition D, unmodified |
|---|---|
| 44 | Stearoyl-acetophenone: 0.2 g |
| 45 | Stearoyl-acetophenone: 0.2 g + D-xylitol: 0.1 g |

The following results were obtained:

TABLE VIII

| Compositions | 0 | 7 | 15 | 25 | 35 | 45 | 55 | 65 | 75 | 80 |
|---|---|---|---|---|---|---|---|---|---|---|
| 43 | 0 | 6 | 8 | black | | | | | | |
| 44 | 0 | 0 | black blotches | | | | | | | |
| 45 | 0 | 0 | 0 | 0 | 1 | 1 | 2 | 2 | 8 | 14 |

While the invention has now been described in terms of preferred embodiments, and exemplified and compared with conventional compositions, the skilled artisan will appreciate that various substitutions, omissions, modifications, and changes may be made without departing from the spirit thereof. Accordingly, it is intended that the scope of the invention be limited solely by the following claims.

What is claimed is:
1. A composition of matter comprising
   (1) a vinyl chloride polymer, and
   (2) heat-stabilizing amounts of (1) a mixture of metal salts of aliphatic and aromatic organic acids selected from the group consisting of calcium/zinc, calcium/cadmium, barium/zinc and barium/cadmium salts of aliphatic and aromatic organic acids, (ii) a polyol, and (iii) a β-diketone having the structural formula:

$$R_1 - CO - CHR_2 - CO - R_3 \qquad (I)$$

wherein $R_1$ and $R_3$, which can be identical or different, represent:

a linear or branched chain alkyl or alkenyl radical having at least one and up to 36 carbon atoms,
an aralkyl radical having from 7 to 36 carbon atoms, and an aryl or cycloaliphatic radical having fewer than 14 carbon atoms, the cycloaliphatic radicals optionally comprising carbon-to-carbon unsaturation; with the proviso that the foregoing radicals $R_1$ and $R_3$ either may or may not be substituted, and, when substituted, each said substituent is selected from the group consisting of halogen, or, in the case of the aryl or cycloaliphatic radicals, methyl or ethyl radicals; said $R_1$ and $R_3$ optionally may also be modified by the presence of one or more of the linkages —O—, $$-\overset{\text{O}}{\underset{\|}{C}}-O-$$

or —CO—, in an aliphatic chain; and together $R_1$ and $R_3$ can also form a divalent alkylene radical of 2 to 5 carbon atoms, optionally containing a bridging oxygen or nitrogen atom;

$R_2$ represents: a hydrogen atom,
an alkyl or alkenyl radical, having at least one and up to 36 carbon atoms, which can contain one or more of the linkages —O—, $$-\overset{\text{O}}{\underset{\|}{C}}-O-$$

or —CO—,
a radical of the formula —CO—$R_4$, $R_4$ representing an alkyl radical having from 1 to 36 carbon atoms, or an aryl radical having from 6 to 10 carbon atoms, or
a radical of the formula $$-R_5-CH{\overset{\displaystyle CO-R_1}{\underset{\displaystyle CO-R_4}{\diagup\diagdown}}},$$

$R_5$ representing an alkyl radical having from 1 to 6 carbon atoms, and $R_1$ and $R_3$ being as above; with the further proviso that;

for $R_1$ and $R_3$, the carbon atom bonded to the respective carbonyl function of the compound (I) is free from ethylenic or carbonyl unsaturation;

for $R_1$ or $R_3$, the carbon atom bonded to the respective carbonyl function does not comprise a moiety which includes aromatic unsaturation;

one of the radicals $R_1$ or $R_3$ can represent a hydrogen atom;

$R_1$ and $R_2$ together can represent a divalent radical selected from among the following:

a linear or branched alkylene or alkenylene radical, having up to 36 carbon atoms, an aralkylene radical having from 7 to 36 carbon atoms, and an arylene or cycloalkylene radical having fewer than 14 carbon atoms, the cycloaliphatic radicals optionally comprising carbon-to-carbon unsaturation; and with the further proviso that such latter radicals too either may or may not be substituted, and, when substituted, each such substituent is selected from the group consisting of halogen, or, in the case of the aryl or cycloaliphatic radicals, methyl or ethyl radicals, and such latter radicals optionally being modified by the presence, in an aliphatic chain, of one or more of the linkages:

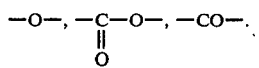

2. The composition of matter as defined by claim 1, wherein the radicals $R_1$, $R_2$ and $R_3$ are unsubstituted.

3. The composition of matter as defined by claim 1, wherein the β-diketone (2) (iii) is selected from the group consisting of benzoylacetone, lauroylbenzoylmethane, myristoylbenzoylmethane, palmitoylbenzoylmethane, stearoylbenzoylmethane, behenoylbenzoylmethane, dilauroylmethane, dimyristoylmethane, dipalmitoylmethane, distearoylmethane, dibehenoylmethane, lauroylmyristoylmethane, lauroylpalmitoylmethane, lauroylstearoylmethane, lauroylbehenoylmethane, myristoylpalmitoylmethane, myristoylstearoylmethane, myristoylbehenoylmethane, palmistoylstearoylmethane, palmitoylbehenoylmethane, stearoylbehenoylmethane, 1-phenyltriacontane-1,3-dione, acetyltetralone, palmitoyltetralone, stearoyltetralone, palmitoylcyclohexanone, stearoylcyclohexanone and (paramethoxybenzoyl)-stearoylmethane.

4. The composition of matter as defined by claim 3, wherein the polyol (2) (ii) is selected from the group consisting of D-xylitol, D-sorbitol and D-mannitol, diglycerol, 4-hydroxy-3,3,5,5-tetrahydroxymethyl-tetrahydropyran, trihydroxyethyl isocyanurate, polyvinyl alcohol, trimethylolpropane, quinic acid, adonitol, α-methylglucoside and glycerol.

5. The composition of matter as defined by claim 1, wherein the mixture of metal salts of aliphatic and aromatic organic acids (2) (i) comprises the mixed salts of calcium and zinc.

6. The composition of matter as defined by claim 1, wherein the mixture of metal salts of aliphatic and aromatic organic acids (2) (i) comprises an anion selected from the group consisting of aliphatic and aromatic carboxylic acids, and fatty carboxylic acids.

7. The composition of matter as defined in claim 6, wherein the anion is selected from the group consisting of acetates, diacetates, stearates, oleates, laurates, palmitates, benzoates, hydroxystearates, and ethyl-2-hexanoates.

8. The composition of matter as defined by claim 1, wherein the vinyl chloride polymer (1) is a vinyl chloride homopolymer.

9. The composition of matter as defined by claim 1, wherein the vinyl chloride polymer (1) is a copolymer of vinyl chloride and up to about 50% by weight of an ethylenically unsaturated comonomer copolymerizable therewith.

10. The composition of matter as defined by claim 1, comprising, per 100 parts by weight of the vinyl chloride polymer (1), from about 0.1 to 5 parts by weight of the mixture of metal salts of aliphatic and aromatic organic acids (2) (i), from about 0.05 to 1 part by weight of the polyol (2) (ii), and from about 0.05 to 5 parts by weight of the β-diketone (2) (iii).

11. The composition of matter as defined by claim 10, comprising from about 0.1 to 1 part by weight of the β-diketone (2) (iii).

12. A shaped article comprising the composition of matter as defined by claim 1.

13. A shaped article comprising the composition of matter as defined by claim 10.

14. A shaped article comprising the composition of matter as defined by claim 5.

15. The composition of matter as defined by claim 1, further comprising at least one member selected from the group consisting of epoxidized soya-bean oil, an antioxidant, a UV light stabilizer, a lubricant, an impact strength modifier, a pigment, a filler, an organo-tin mercaptide, a plasticizer, and admixtures thereof.

16. The composition of matter as defined by claim 1, wherein the β-diketone (2) (iii), $R_2$ is hydrogen.

17. The composition of matter as defined by claim 2, wherein the β-diketone (2) (iii), $R_2$ is hydrogen.

* * * * *